United States Patent [19]

Stirling

[11] 4,342,219

[45] Aug. 3, 1982

[54] PREFABRICATED LABORATORY UNIT AND OCTANE ANALYZER

[75] Inventor: William Stirling, Merseyside, England

[73] Assignee: The Associated Octel Company, Ltd., Merseyside, England

[21] Appl. No.: 227,106

[22] PCT Filed: May 9, 1980

[86] PCT No.: PCT/GB80/00085

§ 371 Date: Nov. 28, 1980

§ 102(e) Date: Nov. 28, 1980

[87] PCT Pub. No.: WO80/02578

PCT Pub. Date: Nov. 27, 1980

[30] Foreign Application Priority Data

May 15, 1979 [GB] United Kingdom ................. 7916763

[51] Int. Cl.³ ......................... G01L 23/22; E04H 5/02

[52] U.S. Cl. ......................................... 73/35; 52/79.11

[58] Field of Search ...................... 52/79.11, 79.7, 292, 52/143, 296, 378, 745; 248/679; 73/35, 653

[56] References Cited

U.S. PATENT DOCUMENTS

| | | | |
|---|---|---|---|
| 2,842,955 | 7/1958 | Pedersen | 248/679 |
| 3,015,912 | 1/1962 | Fistedis | 248/679 |
| 3,274,745 | 9/1966 | McManus et al. | 52/745 |
| 3,729,875 | 5/1973 | Felson | 52/79.7 |

FOREIGN PATENT DOCUMENTS

| | | | |
|---|---|---|---|
| 2054684 | 11/1971 | Fed. Rep. of Germany . | |
| 2127862 | 8/1972 | Fed. Rep. of Germany . | |
| 1488474 | 10/1977 | United Kingdom . | |
| 1531426 | 11/1978 | United Kingdom | 52/79.7 |

*Primary Examiner*—James J. Gill

*Attorney, Agent, or Firm*—Maky, Renner, Otto & Boisselle

[57] ABSTRACT

A prefabricated laboratory unit is provided having walls, a floor and a ceiling forming an integral transportable unit. To provide a vibration-free mounting for laboratory apparatus within the laboratory the floor (4) of the unit has a hole (17) therein through which a prepared foundation (18) is exposed. Mounted on the floor of the unit above the hole (17) is a plinth (15) which is lowerable through the hole when the laboratory is in position onto the prepared foundation by means of jacks (16). The plinth provides a vibration-free mounting for the apparatus. Preferably the laboratory is fitted out as a self-contained octane analyzer unit comprising a reference engine mounted on the plinth and also housing a control console and comparator unit for the comparison of octane ratings during inline gasoline blending.

7 Claims, 3 Drawing Figures

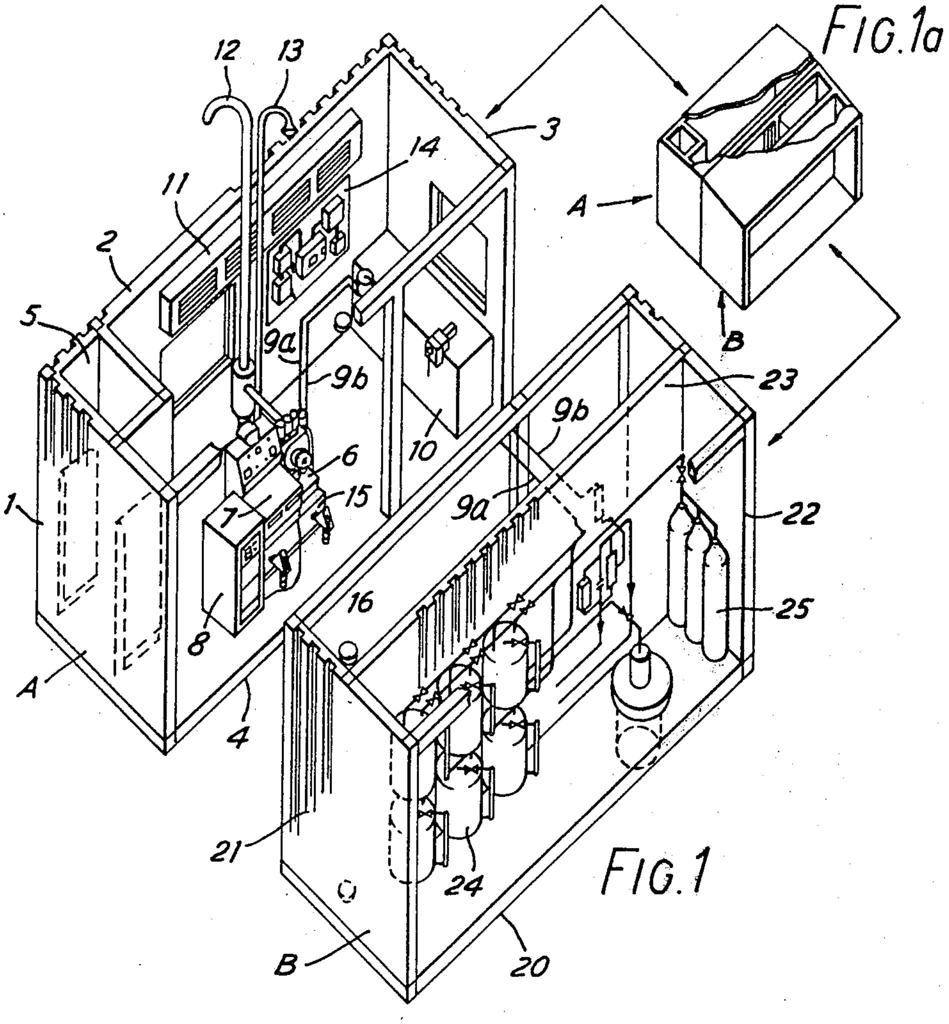
FIG. 1a
FIG. 1
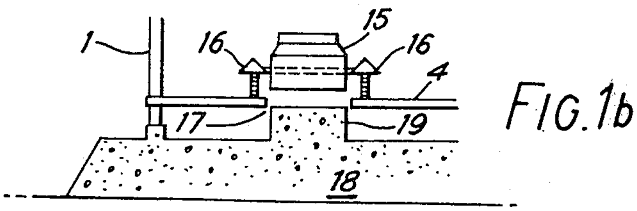
FIG. 1b

PREFABRICATED LABORATORY UNIT AND OCTANE ANALYZER

TECHNICAL FIELD

This invention relates to prefabricated buildings, in particular a prefabricated laboratory for use in the petroleum refining industry.

BACKGROUND ART

In the petroleum refining industry a need has arisen for a prefabricated laboratory housing an octane analyser unit and which can be transported to and placed on site with the minimum of site preparation. This is particularly so in the case of in-line gasoline blending operations where continuous monitoring of the octane rating of the gasoline being blended is necessary so that rapid adjustments can be made in the feed rates of the various components should the obtained octane number fluctuate from the desired value. Customarily octane ratings are monitored using a standard engine which is fed alternately with a reference fuel of known octane rating and the line gasoline. The knock intensities of the two fuels are evaluated and compared electronically in a comparator and a control signal produced proportional to the variation of the octane rating of the line gasoline from the desired value. This control signal is then used to adjust the flow rate of, for example, the lead alkyl antiknock compound so as to adjust the octane value of the line gasoline to the desired value. To save labour and other costs it is desirable that the analyser be provided as a prefabricated unit which can be transported to and installed on site ready to operate with the minimum of site preparation. However, a prime requirement for the reference engine is a substantially vibration-free mounting which requirement conflicts with the requirement for prefabrication and transportability.

Prefabricated portable buildings are, of course, well known, including prefabricated portable laboratories constructed to the internationally standard dimensions of a container according to the internationally agreed Container-Transport-System (CTS), see for example, German OLS 2 054 684 and 2 217 862, but, in general, such prefabricated laboratories do not recognise or solve the problem of providing a substantially vibration-free mounting for apparatus to be installed in the laboratory and which is sensitive to vibration and which therefore requires a vibration-free mounting.

DISCLOSURE OF INVENTION

In accordance with the present invention this problem has been solved by providing a prefabricated labortory having walls, a floor and a ceiling forming an integral transportable unit and within which are or may be installed the reference engine and its ancillary equipment or other apparatus requiring a vibration-free mounting, the floor of the unit having a hole therethrough and, supported on jacks directly above said hole, a plinth mounting or adapted to mount said engine or other apparatus and being lowerable by said jacks, when the laboratory is in the desired location, onto a prepared foundation exposed through said hole. With the prefabricated laboratory of this invention only a minimum of site preparation is necessary, e.g. levelling and the casting of a concrete platform immediately below where the hole in the floor of the laboratory is to be located and providing a firm base upon which to lower and secure the plinth of the engine in a vibration-free manner. Preferably the laboratory of this invention is used in conjunction with a foundation comprising an upstanding platform, which when the laboratory is in position on its foundation, projects upwardly through the hole in the floor to provide the fixed platform upon which to lower and secure the plinth of the reference engine.

If it is desired to move the laboratory to a new site it is merely necessary to release any fastening members which are used to secure the engine plinth to the foundation member, raise the plinth, with the engine or other apparatus mounted thereon, slightly above the level of the floor by means of the jacks. The laboratory can then be lifted off the foundation as a complete unit and transported to a new site.

Desirably the labortory of this invention is fully fitted out so that upon installation at a desired site it is merely necessary to lower the engine onto the prepared base, connect up the laboratory to the mains services, e.g. electricity, provided on site, and to connect up the gasoline feed line. The laboratory is then fully operational.

In a preferred form, the laboratory of this invention is constructed to the dimensions of a standard container module e.g. 20 ft×8 ft×8 ft, (6.1 m×2.44 m×2.44 m), so that the laboratory can be transported by standard container transportation equipment. Desirably the corners of the module are designed to accept a conventional twist lock to secure the module during transportation.

In order to increase the interior space available the prefabricated laboratory of this invention may be constructed in two or more parts each part comprising one standard size module, which modules may be separately transported and placed on site in side-by-side or end-to-end intercommunicating relationship.

Whilst the invention has so far been described in terms of a prefabricated laboratory for use in the petroleum industry and providing a means for the vibration-free mounting of a standard engine used in the evaluation and control of octane number in gasoline blending operations, it will be understood that the principles of this invention may be employed wherever a prefabricated building is required, but which at the same time has to provide a substantially vibration-free mounting for a particular piece of apparatus or equipment.

BRIEF DESCRIPTION OF DRAWINGS

The invention is further described with reference to the accompanying drawings in which:

FIG. 1 is an artist's impression of two units which go together to make up a laboratory in accordance with this invention, the roof or ceiling panel of each unit having been removed to show the interior lay-out;

FIG. 1*a* shows the two units as installed in side-by-side relation; and

FIG. 1*b* shows a detail of the mounting of the engine plinth within one of the two units.

BEST MODE OF CARRYING OUT THE INVENTION

Referring to the drawings, a preferred form of laboratory in accordance with this invention is shown, for use in monitoring octane ratings of gasoline blends in a petroleum refinary.

The laboratory is constructed in two halves, A, B, each comprising a standard size rectangular module in which the various laboratory apparatus is pre-mounted. Each module constitutes a self-contained transportable unit and fit together side-by-side, as shown in FIG. 1*a*, to form a completely self-contained and fully equipped laboratory. Since the laboratory equipment does not form part of this invention, this will not be described in detail except as may be necessary for an understanding of the utility of the present invention.

The first rectangular module A is defined on three sides by walls, 1, 2, 3, the fourth side being left open. If desired, this fourth side can be enclosed during transportation by temporary shuttering. The module A has an integral floor 4 and an integral roof or ceiling, which in FIGS. 1 and 1*a* has been cut away so as to expose the interior. Access to the interior of the module is via an air lock 5.

Mounted on the floor 4 of module A in a manner to be described, is a reference engine 6 and its control console 7, and a comparator unit 8 for the comparison, in a manner known per se, of the octane ratings of the reference and line gasoline which are alternately fed to the engine through lines 9*a* and 9*b*.

Ancillary equipment in module A includes a work bench 10, a ventilation unit 11, an exhaust pipe 12 and a crankcase breather 13 for the engine and an electric control panel 14.

Referring now to the engine mounting, shown in detail in FIG. 1*b*, and which is the characteristic feature of this invention, this comprises a plinth 15 to which the engine 6 may be suitably secured, e.g. by bolts. The plinth itself is mounted on jacks 16, which during transportation of the module, hold the plinth, with the engine mounted thereon above the level of the floor 4. Immediately below the plinth 15 the floor is cut away to form an aperture 17 through which, when the module is placed on site, a prepared sub-base is exposed. As shown in FIG. 1*b*, this sub-base preferably comprises a concrete slab 18 having an upstanding block 19 located immediately below the aperture 17 and onto which the plinth 15 may be lowered by means of the jacks 16 when the module is in position on the sub-base 18. If desired bolts or other fastening means may be provided for securing the plinth to the sub-base.

Referring now to module B, this has a floor 20, two opposite end walls 21, 22 and a roof or ceiling (not shown in FIG. 1). Both longitudinal sides of module B are normally open, but may be provided with temporary shuttering during transportation of the module. Module B does, however, have an interior dividing wall or bulkhead 23. Mounted in module B, on the open side of the bulkhead 23 are supply tanks 24 for the reference fuel, a sample preparation system for delivery of reference gasoline and line gasoline through lines 9*a* and 9*b* to the engine in module A. The two sections of lines 9*a* and 9*b*, i.e. those in modules A and B will be provided with suitable unions for quickly joining the two sections together when the two modules are installed in side-by-side relation as shown in FIG. 1*a*. Module B also has mounted therein a pressurised gas, e.g. nitrogen, supply 25 for feeding the fuels under pressure to the reference engine.

Both modules A and B are of a standard dimension, e.g. 20 ft×8 ft×8 ft (6.1 m×2.44 m×2.44 m) and can be individually transported by conventional container handling equipment. The two units can therefore easily be transported and set up at the desired location within a refinery with the minimum of site preparation. Once in place, the engine plinth carrying the engine can be lowered onto the exposed area of the sub-base to provide a vibration-free mounting, and the various services, e.g. electricity, connected up to the two modules. The line gasoline can also be rapidly connected, and the laboratory is ready to operate.

Various modifications and other applications of the portable laboratory of this invention will be apparent to the person skilled in the art.

I claim:

1. A prefabricated laboratory having walls, a floor and a ceiling forming an integral transportable unit and within which is or may be installed an apparatus requiring a substantially vibration-free mounting, characterised in that the floor of the unit has a hole therein, which when the unit is in position at a desired site, exposes a prepared foundation for said apparatus, and wherein there is mounted in the said unit immediately above said hole a plinth mounting or serving to mount said apparatus, said plinth being mounted on jacking means which permit said plinth, when the unit is in the desired position, to be lowered onto the prepared foundation which is exposed through said hole.

2. A prefabricated laboratory according to claim 1, constructed in two or more sections, each section forming a separate transportable unit and fitting together on site in abutting relation to form the laboratory, at least one of said sections being provided with said hole and said plinth mounting or serving to mount said apparatus.

3. A prefabricated laboratory according to claim 1 or 2, wherein the or each unit is constructed as a substantially rectangular module.

4. A prefabricated laboratory according to claim 3 in the form of an octane analyser unit, said laboratory having mounted on said plinth a reference engine for the determination of anti-knock values in a gasoline blending operation, and wherein the laboratory houses a control console for the reference engine, a comparator unit for comparison of the octane ratings of a reference fuel and the gasoline blend, and gasoline lines for feeding said reference fuel and gasoline blend to said engine.

5. A prefabricated laboratory according to claim 3, wherein the module or modules each have the standard dimensions of a container according to the international Container-Transport-System.

6. A prefabricated laboratory according to claim 5 in the form of an octane analyser unit, said laboratory having mounted on said plinth a reference engine for the determination of anti-knock values in a gasoline blending operation, and wherein the laboratory houses a control console for the reference engine, a comparator unit for comparison of the octane ratings of a reference fuel and the gasoline blend, and gasoline lines for feeding said reference fuel and gasoline blend to said engine.

7. A prefabricated laboratory according to any one of claims 1 or 2, in the form of an octane analyser unit, said laboratory having mounted on said plinth a reference engine for the determination of anti-knock values in a gasoline blending operation, and wherein the laboratory houses a control console for the reference engine, a comparator unit for comparison, of the octane ratings of a reference fuel and the gasoline blend, and gasoline lines for feeding said reference fuel and gasoline blend to said engine.

* * * * *